United States Patent Office 2,972,143
Patented Feb. 14, 1961

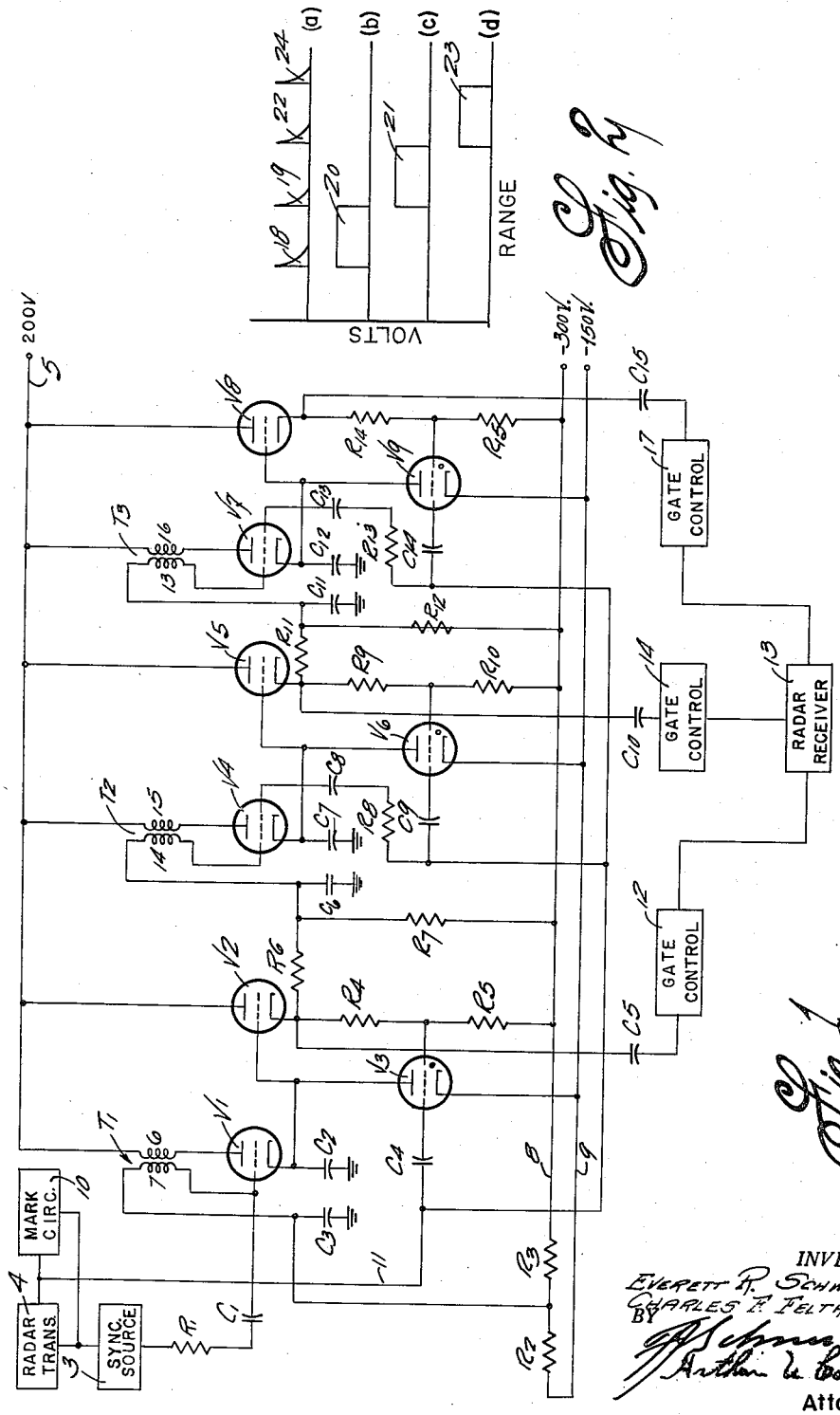

2,972,143

PULSE SEPARATOR AND GATE GENERATOR

Everett R. Schwartz, Fort Wayne, Ind., and Charles F. Feltham, Jr., Huntington, N.Y., assignors, by mesne assignments, to the United States of America as represented by the Secretary of the Navy Filed Jan. 13, 1958, Ser. No. 708,737

4 Claims. (Cl. 343—13)

The present invention relates to a novel and improved electronic pulse separating circuit and more particularly to a novel and improved pulse separating circuit wherein a plurality of output circuits are independently and successively energized as the individual pulses of a series of pulses successively occur.

In many electronic circuit applications, it becomes necessary and desirable to use the successive individual pulses of a pulse train to energize a plurality of independent circuits. Thus, for example, in various types of radar ranging systems in order to concentrate attention within a selected range area, it often becomes desirable to gate the radar receiver on only during the time interval when echo signals from a target in a predetermined range area return to the receiver. Although various circuit arrangements have been used to do this in the past, considerable difficulty has been experienced heretofore in devising a circuit which is relatively simple in construction and yet reliable in operation.

It is a principal object of the present invention to provide a novel and improved electronic circuit which selects successive pulses of a pulse train for individual energization of a plurality of output circuits.

It is a further object of the present invention to provide a novel and improved radar ranging circuit in which each successive pulse of a marking circuit is used to energize an individual gating circuit of the radar system.

Other objects and many of the attendant advantages of this invention will be readily appreciated as the same becomes better understood by reference to the following detailed description when considered in connection with the accompanying drawings wherein:

Figure 1 is a schematic view of a preferred embodiment of the present invention; and Figure 2 shows the time sequence of various waveforms of pulses in the embodiment of Figure 1.

A preferred embodiment of the present invention is illustrated in Figure 1 of the drawing. As shown therein, the circuit synchronizing signal source 3, which initiates radiation of an outgoing pulse from the radar transmitter 4, is coupled to the control grid of triode V-1 through resistor R-1 and condenser C-1. The plate circuit of triode V-1 extends from the positive 200 volt supply line 5 through the plate winding 6 of transformer T-1 through the tube and condenser C-2 to ground. The control grid of triode V-1 is coupled to ground through the grid feedback winding 7 of transformer T-1 and condenser C-3, and the junction of winding 7 and condenser C-3 is connected to the voltage dividing circuit of resistors R-2 and R-3 which are series connected between the negative 300 volt supply line 8 and the negative 150 volt supply line 9. The cathode of triode V-1 is connected to the control grid of triode V-2 and to the plate of thyratron V-3. The plate circuit of triode V-2 extends from the positive 200 volt line 5 through the tube and through resistors R-4 and R-5 to the negative 300 volt supply line 8. The plate circuit of thyratron V-3 extends from the cathode connected terminal of condenser C-2 through the tube to the negative 150 volt line 9. The grid of thyratron V-3 is connected to the junction of resistors R-4 and R-5 and is also coupled to the marking circuit 10 through condenser C-4 and conductor 11. The cathode of triode V-2 is coupled to the 0–5 mile gate control circuit 12 and the radar receiver 13 through condenser C-5. The cathode of triode V-2 is also connected to the control grid of triode V-4 through resistor R-6 and winding 14 of transformer T-2. The junction of resistor R-6 and winding 14 is connected to the negative 300 volt line 8 through resistor R-7 and to ground through condenser C-6. The plate circuit of triode V-4 extends from the positive 200 volt line 5 through the plate winding 15 of transformer T-2 and through the tube and condenser C-7 to ground. The grid of triode V-4 is also coupled to the output line 11 of the marking circuit 10 through condenser C-8 and resistor R-8. The cathode of triode V-4 is connected to the control grid of triode V-5 and to the plate of thyratron V-6. The plate circuit of triode V-5 extends from the positive 200 volt line 5 through the tube and through resistors R-9 and R-10 to the negative 300 volt line 8. The plate circuit of thyratron V-6 extends from the cathode connected terminal of condenser C-7 through the tube to the negative 150 volt line 9. The grid of thyratron V-6 is connected to the junction of resistors R-9 and R-10 and is also coupled to the marking circuit 10 through condenser C-9, and conductor 11. The cathode of triode V-5 is coupled to the 5–10 mile gate control circuit 14 and the radar receiver 13 through condenser C-10. The cathode of triode V-5 is also connected to the control grid of triode V-7 through resistor R-11 and winding 15 of transformer T-3. The junction of resistor R-11 and winding 15 is connected to the negative 300 volt line 8 through resistor R-12 and to ground through condenser C-11. The plate circuit of triode V-7 extends from the positive 200 volt line 5 through the plate winding 16 of transformer T-3 and through the tube and condenser C-12 to ground. The grid of triode V-7 is also coupled to the output line 11 of the marking circuit through condenser C-13 and resistor R-13. The cathode of triode V-7 is connected to the control grid of triode V-8 and to the plate of thyratron V-9. The plate circuit of triode V-8 extends from the positive 200 volt line 5 through the tube and through resistors R-14 and R-15 to the negative 300 volt line 8. The plate circuit of thyratron V-9 extends from the cathode connected terminal of condenser C-12 through the tube to the negative 150 volt line 9. The grid of thyratron V-9 is connected to the junction of resistors R-14 and R-15 and is also coupled to the marking circuit 10 through condenser C-14 and conductor 11. The cathode of triode V-8 is coupled to the 10–15 mile gate control circuit 17 and the radar receiver 13 through condenser C-15.

In the operation of the above described circuit, when the pulse of positive polarity 18 is developed by the synchronizing circuit 3 to energize the radar transmitter 4 and the conventional range marker circuit 10, the control grid of triode V-1 is driven positive. This energizes the single swing blocking oscillator circuit of tube V-1 and causes the flow of current through its plate circuit to develop a positive charge across condenser C-2. The resulting increase of potential at the cathode of triode V-1 energizes the cathode follower circuit of triode V-2 such that the flow of plate current through its cathode resistor R-5 substantially increases the potential of the cathode of triode V-2 and the grid of thyratron V-3. The increase in potential at the cathode of triode V-2 reduces the bias at the grid of triode V-4 such that as will be more apparent hereinafter its associated blocking oscillator circuit will be energized when the first pulse 19 of the range marking circuit 10 occurs. The abrupt increase of potential at the cathode of triode V-2 also provides the leading edge of the square wave pulse 20 shown in Figure 2 of the drawing which is used to selectively gate on the receiver circuit of the radar gear preferably over a range of 0–5 miles. The increase of potential at the grid of thyratron V-3 conditions it such that when the first pulse 19 from the range marker 10 occurs, thyratron V-3 fires. This discharges condenser C-2, cuts off triode V-2, and abruptly reduces the potential of the cathode of triode V-2 to provide the trailing edge of the square wave pulse 20 in Figure 2.

The first positive pulse 19 from marking circuit 10 is also fed through condenser C-8 onto the control grid of triode V-4. This energizes the single swing blocking oscillator circuit of triode V-4 and causes the flow of current through its plate circuit to develop a positive charge across condenser C-7. The increase of potential at the cathode of triode V-4 energizes the cathode follower circuit of triode V-5 such that the flow of plate current through its cathode resistor R-10 abruptly increases the potential of the cathode of triode V-5 and produces the leading edge of the square wave pulse 21 which is used to selectively gate on the receiver 13 over a range of 5–10 miles. When the second range marking pulse 22 occurs, thyratron V-6 with its reduced grid bias potential due to the flow of plate current of triode V-5 through resistor R-10 fires, and condenser C-7 discharges. When this occurs, triode V-5 is cut off and the potential of the cathode of triode V-5 is reduced abruptly to form the trailing edge of the square wave gating pulse 21.

The second output pulse from the marking circuit 22 is also fed through condenser C-13 to the control grid of triode V-7. This energizes the single swing blocking oscillator circuit of triode V-7 and causes the flow of current through its plate circuit to develop a positive charge across condenser C-12. The increase of potential at the cathode of triode V-7 energizes the cathode follower circuit of triode V-8 and the flow of plate current through the cathode resistor R-15 produces an abrupt increase in potential at the cathode of V-8. This provides the leading edge of the square wave pulse 23 which is used to selectively gate on the receiver 13 over a range of 10–15 miles. When the third range marking pulse 24 occurs, thyratron V-9 having had its grid bias potential reduced due to the flow of plate current of tube V-8 through resistor R-15 fires, and condenser C-12 discharges. This cuts off triode V-8 abruptly, lifts its cathode potential and forms the trailing edge of the square wave gating pulse 23. With each succeeding output pulse from the synchronizing circuit—the entire cycle of operation described above is repeated.

It is to be understood that, although for the sake of simplicity, circuitry for the control of only three gate control circuits is shown and described herein similar circuitry for the control of any greater or lesser number of gate control circuits could be used without departing from the spirit or scope of the present invention.

Obviously many modifications and variations of the present invention are possible in the light of the above teachings. It is therefore to be understood that within the scope of the appended claims the invention may be practiced otherwise than as specifically described.

What is claimed is:

1. Apparatus for successively and independently energizing a plurality of output circuits as each pulse of a series of pulses is received said apparatus comprising a plurality of tandem connected normally deenergized control circuits, each individual control circuit being coupled to an individual output circuit; means responsive to a first pulse of said series of pulses for energizing one of the said control circuits; a normally deenergized blocking oscillator coupled to the output of said one control circuit, said oscillator being conditioned for energization when the said one control circuit is energized; means responsive to a second pulse of said series of pulses for energizing said blocking oscillator; a condenser which charges to a predetermined potential when the said blocking oscillator is energized; means effective when the condenser develops its charge for energizing the next succeeding control circuit and for conditioning the next tandem connected circuit for energization; and means also responsive to the said second pulse for deenergizing said one control circuit.

2. Apparatus for successively and independently energizing a plurality of output circuits as each pulse of a series of pulses is received said apparatus comprising a plurality of tandem connected normally deenergized control circuits, each individual control circuit being coupled to an individual output circuit; means responsive to a first pulse of said series of pulses for energizing one of the said control circuits; a normally deenergized blocking oscillator coupled to the output of said one control circuit, said oscillator being conditioned for energization when the said one control circuit is energized; means responsive to a second pulse of said series of pulses for energizing said blocking oscillator; a condenser which charges to a predetermined potential when the said blocking oscillator is energized; means effective when the condenser develops its charge for energizing the next succeeding control circuit and for conditioning the next tandem connected circuit for energization; and means including a normally deenergized thyratron also responsive to the said second pulse for deenergizing said one control circuit.

3. In a radar ranging system having a transmitter, a receiver, and a marking circuit apparatus for successively energizing a plurality of gate circuits which gate the radar receiver on during selected time intervals said apparatus comprising a plurality of tandem connected normally deenergized control circuits, each individual control circuit being coupled to an individual gate circuit; means for energizing one of the said control circuits; a normally deenergized blocking oscillator coupled to the output of said one control circuit, said oscillator being conditioned for energization when the said one control circuit is energized; means responsive to a first pulse of a series of marking circuit pulses for energizing said blocking oscillator; means responsive to energization of the blocking oscillator for energizing said next succeeding control circuit; means also responsive to energization of the blocking oscillator for deenergizing said one control circuit; and means also responsive to energization of the blocking oscillator for conditioning the next tandem connected control circuit for energization.

4. In a radar ranging system having a transmitter, a receiver, and a marking circuit apparatus for successively energizing a plurality of gate circuits which gate the radar receiver on during selected time intervals said apparatus comprising a plurality of tandem connected normally deenergized control circuits, each individual control circuit being coupled to an individual gate circuit; means including a synchronizing pulse source for energizing one of the said control circuits; a normally deenergized blocking oscillator coupled to the output of said one control circuit, said oscillator being conditioned for energization when the said one control circuit is energized; means responsive to a first pulse of a series of marking circuit pulses for energizing said blocking oscillator for energizing said next succeeding control circuit; means also responsive to energization of the blocking oscillator for deenergizing said one control circuit; and means also responsive to energization of the blocking oscillator for conditioning the next tandem connected control circuit for energization.

References Cited in the file of this patent

UNITED STATES PATENTS 2,742,639    Moore _____ Apr. 17, 1956